United States Patent Office 3,426,084
Patented Feb. 4, 1969

3,426,084
PROCESS FOR THE PRODUCTION OF
β-NITROETHANOL
Hen N. Lee, Dearborn, and Russell W. Van House, Grosse
Pointe Woods, Mich., assignors to Parke, Davis & Company, Detroit, Mich., a corporation of Michigan
No Drawing. Continuation of application Ser. No.
259,733, Feb. 19, 1963. This application June 15,
1966, Ser. No. 557,603
U.S. Cl. 260—632                                    4 Claims
Int. Cl. C07c 79/18

ABSTRACT OF THE DISCLOSURE

The product β-nitroethanol is produced usefully and in good yield in the reaction of ethylene oxide with sodium nitrite by the improvement involving control of the hydrogen ion concentration (pH 7.1 to 7.5) and maintenance of a light color in the reaction medium through use of a nitrite ion scavenger.

---

This application is a continuation of our copending application Ser. No. 259,733 filed Feb. 19, 1963, now abandoned.

This invention relates to an improved process for the production of β-nitroethanol. More particularly, the invention relates to the production of β-nitroethanol using ethylene oxide and sodium nitrite as starting materials.

Prior to our invention a number of methods for producing β-nitroethanol were known. One of these, involving the reaction of nitromethane and formaldehyde in a non-aqueous medium, is hazardous inasmuch as nitromethane and β-nitroethanol are explosive under conditions apt to be encountered during reaction and distillation. Moreover, the starting materials are relatively costly. On the other hand, another of these methods using ethylene oxide and metal nitrite as starting materials in an aqueous medium under carbon dioxide pressure, is reported to be unworkable (cf. Organic Syntheses, 41, 67–72, 1961).

One object of the invention is to provide an economical method for the production of β-nitroethanol.

Another object is to provide a method for obtaining good yields of β-nitroethanol.

Still another object is to provide a method for producing β-nitroethanol on an industrial scale which avoids the inconvenience, expense, hazards and risks of high pressure operation.

Other objects and advantages will be apparent from the following description.

In accordance with the invention, β-nitroethanol is produced by reacting ethylene oxide with at least an equivalent amount of sodium nitrite in an aqueous medium containing phosphoric acid in an amount sufficient to maintain the reaction medium at pH 7.1 to 7.5 and in the presence of a nitrite-ion scavenger such as sodium hydrosulfite ($Na_2S_2O_4$), phloroglucinol and the like, as required to maintain the reaction mixture colorless to light yellow. Upon completion of the reaction, insoluble salts are removed by filtration or centrifugation. The aqueous filtrate which contains the desired β-nitroethanol in good yield is suitable for use without further purification as an intermediate for the production of the antibiotic chloramphenicol.

In carrying out the reaction, the proportion of ethylene oxide and sodium nitrite is subject to considerable variation. At least an equivalent amount, as indicated, and preferably an excess of sodium nitrite is employed. For best results, an excess of about 20% of sodium nitrite is used. Although unnecessary, larger proportions can be used. To start the reaction, the reactants are advantageously mixed in the cold using water as a solvent, while maintaining the reaction zone free of atmospheric oxygen, and the reaction mixture allowed to warm to about 15° C. To insure an inert atmosphere, the reaction zone is purged of air through a suitable outlet and kept free of atmospheric oxygen throughout the reaction conveniently by means of a slight nitrogen pressure. Suitably, the reaction is run at temperatures in the range of about 15 to 25° C. At lower temperature, the reaction is unduly slow whereas at higher temperatures the desired product is subject to decomposition. For best results, a reaction temperature of 20° C. is employed. During the reaction, the medium is maintained on the slightly basic side, i.e., at pH 7.1 to 7.5 and preferably at pH 7.1 to 7.3, by addition of phosphoric acid. Also during the reaction, to prevent the formation of unwanted red- to brown-colored by-products and consequent lowering of the yield of the desired product, a nitrite-ion scavenger, preferably sodium hydrosulfite, is added, as required, to maintain the reaction medium colorless to light yellow. The reaction is complete when the pH remains constant without further addition of acid. Following completion of the reaction, the solids are removed, preferably by centrifugation.

The aforementioned reactants are commercially available in large quantity. Technical grades are satisfactory.

The invention is illustrated by the following example.

Materials:
  Sodium nitrite, technical _____ kg__   118.6
  Ethylene oxide _____ kg__      63
  Sodium hydrosulfite _____ kg__  25 or q.s.
  Water _____ liters__  121
  Phosphoric acid, aqueous, 75% by
    weight _____ liters__   45

(1) To a 75 gallon glass-lined still, charge the sodium nitrite and water. Seal the system, test for leaks with 5 lbs. nitrogen, and cool to 0° C. with coolant at −12° C. After testing for leakage, vent the reactor to atmospheric pressure through a condenser circulating with coolant at −12° C. Purge the system with nitrogen at approximately 2 p.s.i. pressure throughout the run.

(2) Add the ethylene oxide so that the inlet line is below the level of the aqueous sodium nitrite solution. Allow approximately ½ hour for the addition of each 22.7 kg. cylinder of ethylene oxide. Control the pH during the ethylene oxide addition at 7.1–7.3 by adding phosphoric acid. During the addition of the ethylene oxide allow the reactants to warm slowly to 15° C. and add sodium hydrosulfite so as to maintain the color of the solution slightly yellow.

(3) After 15 liters of phosphoric acid have been added, warm the reaction mixture to 20° C. and continue the reaction maintaining the pH at 7.1–7.3 until a total of 45 liters of phosphoric acid have been added.

(4) Cool the reaction mixture to 15° C. and filter in two loads through a 30″ stainless steel centrifuge. Wash the cake in each load with 45 liters of ice water. Discard the cake of inorganic salts.

(5) Cool the aqueous filtrate to −5° C., centrifuge into a 100 gallon open kettle. The resulting product is a solution of β-nitroethanol in water; yield, about 65 kg. of β-nitroethanol.

The foregoing procedure can also be carried out using phloroglucinol in place of sodium hydrosulfite; sufficient phloroglucinol (about 30 kg.) is used to maintain the color of the solution slightly yellow.

We claim:

1. In a process for the production of β-nitroethanol from ethylene oxide and at least an equivalent amount of sodium nitrite in an aqueous medium at 15–25° C., the improvement which comprises maintaining the pH of the reaction medium in the range 7.1 to 7.5 by means of phosphoric acid and keeping the reaction mixture colorless to light yellow by addition of a nitrite-ion scavenger, whereby increased yields of β-nitroethanol are obtained, the nitrite ion scavenger being selected from the group consisting of sodium hydrosulfite and phloroglucinol.

2. Process according to claim 1 wherein the reaction is carried out at pH 7.1 to 7.3 at a temperature of about 20° C.

3. Process according to claim 1 wherin the nitrite-ion scavenger is sodium hydrosulfite.

4. Process according to claim 1 where about 1.2 equivalents of sodium nitrite are employed for each equivalent of ethylene oxide.

References Cited

Miura: Chem. Abst., vol. 48 (1954), p. 1412.

LEON ZITVER, *Primary Examiner.*

J. E. EVANS, *Assistant Examiner.*

U.S. Cl. X.R.

260—562